United States Patent [19]
Berndt et al.

[11] Patent Number: 5,414,727
[45] Date of Patent: May 9, 1995

[54] ACTIVE CURRENT CONTROL APPARATUS

[75] Inventors: Dale F. Berndt, Plymouth; Joseph E. Killpatrick, Minneapolis, both of Minn.

[73] Assignee: Honeywell Inc., Minneapolis, Minn.

[21] Appl. No.: 769,067

[22] Filed: Sep. 30, 1991

[51] Int. Cl.$^6$ ............................................... G01B 9/02
[52] U.S. Cl. ........................................ 372/38; 372/94; 356/350
[58] Field of Search ...................... 372/38, 94; 356/350

[56] References Cited

U.S. PATENT DOCUMENTS

| 4,667,162 | 5/1987 | Broberg et al. | 372/94 X |
| 5,088,824 | 2/1992 | Killpatrick et al. | 356/350 |
| 5,100,235 | 3/1992 | Priddy et al. | 356/350 |

*Primary Examiner*—Mark Hellner
*Attorney, Agent, or Firm*—Ronald E. Champion

[57] ABSTRACT

An active current control apparatus for a ring laser gyro includes an apparatus for generating a control signal representative of a current value, such as, for example a microprocessor controller. Apparatus for supplying actively controlled current to the anode of the ring laser gyro in response to the control signal is coupled to the control signal so as to provide a constant current in the ring laser gyro beam path.

22 Claims, 5 Drawing Sheets

5,414,727

ACTIVE CURRENT CONTROL APPARATUS

This invention relates generally to ring laser gyros and, more particularly, to a method and apparatus for active current control of laser beams in a ring laser gyro.

BACKGROUND OF THE INVENTION

Ring laser angular rate sensors, often also called ring laser gyros, are well known. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of interconnected formed cavities. Mirrors are placed at the extremities of the cavities for reflecting laser beams and providing an optical closed-looped path.

In operating a ring laser gyro it is important to maintain the laser beam current in each leg of the ring laser gyro between an anode and a cathode within a desired operating range such as, for example, about 0.15 ma to about 1.0 ma. In the prior art, large resistors called ballast resistors are employed to maintain stability of the plasma within the desired current range. Unfortunately, such ballast resistors tend to be very large resulting in a large amount of wasted power. Further, it is necessary to select these ballast resistors for each individual ring laser gyro out of a range of selectable ballast resistors. This selection or calibration of each ring laser gyro, results in higher production costs and less reliable current control than that which is provided by the present invention. Ballast resistors used in the prior art had to be carefully selected in order to match the current in both legs to within better than one percent (1%) in order to reduce bias characteristics in the ring laser gyro. Further still, current control circuits of the prior art required high voltages and wide bandwidth circuits in order to achieve a high performance ring laser gyro.

The present invention overcomes the deficiencies of the prior art by providing an active current control apparatus which does not require selected ballast resistors, uses conventional active elements and medium performance operational amplifiers, and yields a high performance ring laser gyro with no plasma oscillations over the entire operating range of desirable currents. Furthermore, through the use of a microprocessor based controller, the active current control apparatus of the invention maintains a high degree of accuracy and reliability in a ring laser gyro system application.

As a basis for designing the active current control apparatus of the present invention, design data was taken on a GG1320 model number ring laser gyro as manufactured by Honeywell Inc. of Minneapolis, Minn. The data taken was within the operating window of laser beam current with cathode current as a function of ballast resistor and with capacitance as a parameter. Since the 1320 model ring laser gyro operates in the negative resistance region of the current-voltage characteristic, stray capacitance near the anodes can significantly effect the operating window. Operating windows as a function of current were obtained for the regions wherein plasma oscillations occurred. Ballast resistors as low as zero ohms and capacitance less than 15 pF had a very small effect on the operating window. This data was useful in defining the requirements for high voltage and low capacitance semiconductor devices employed in the present invention.

SUMMARY OF THE INVENTION

An active current control apparatus for a ring laser gyro is provided. The ring laser gyro includes a first electrode of a first polarity, such as, for example, an anode and another electrode of a second, opposite polarity, such as, for example, a cathode. The active current control apparatus includes a means for generating a control signal representative of a current value, such as, for example a microprocessor controller. Means for supplying actively controlled current to the anode of the ring laser gyro in response to the control signal is coupled to the control signal.

It is one object of the invention to provide an active current control apparatus of wherein the means for generating a digital control signal representative of a current value comprises a digital controller such as a microprocessor.

It is another object of the invention to provide an active current control apparatus wherein the digital controller comprises a microprocessor including first and second analog-to-digital converter input ports.

It is another object of the invention to provide an active current control apparatus where the current command is an analog signal.

It is another object of the invention to provide an active current control means that can vary the operating current over a wide range of values in response to command inputs for various laser gyro functions including calibration, mode changes and operation monitoring.

It is yet another object of the invention to provide an active current control apparatus wherein the active current control apparatus further includes a means for running a built-in-test of the active current control apparatus.

It is yet a further object of the invention to provide an active current control apparatus wherein the ring laser gyro includes a first anode and a second anode and the means for supplying actively controlled current to the anode of the ring laser gyro comprises a first current source leg and a second current source leg, wherein the first current source leg is coupled to the first anode and the second current source leg is coupled to the second anode and the currents in each current source leg are matched to within about 1% or less.

Another object of the invention is to provide a nearly ideal current source that has substantially infinite impedance over the entire frequency spectrum of interest. In particular, one example has an impedance looking back into the output of greater than $10^6$ ohms at DC and at least $10^3$ ohms at 40 MHz.

Another object of the invention in an alternate aspect of the invention is to provide an active current control apparatus wherein a microprocessor including a plurality of analog-to-digital inputs samples the output voltage of the active current control apparatus. Then, in turn, the microprocessor responds to the sampled output by controlling a pulse width modulated DC/DC converter which adjusts the ring laser gyro cathode voltage to minimize power dissipated in the ring laser gyro and associated electronics.

Other objects, features and advantages of the present invention will become apparent to those skilled in the art through the Description of the Preferred Embodiment, claims, and drawings herein wherein like-numerals refer to like elements.

DESCRIPTION OF THE PREFERRED EMBODIMENT

Figure 1:
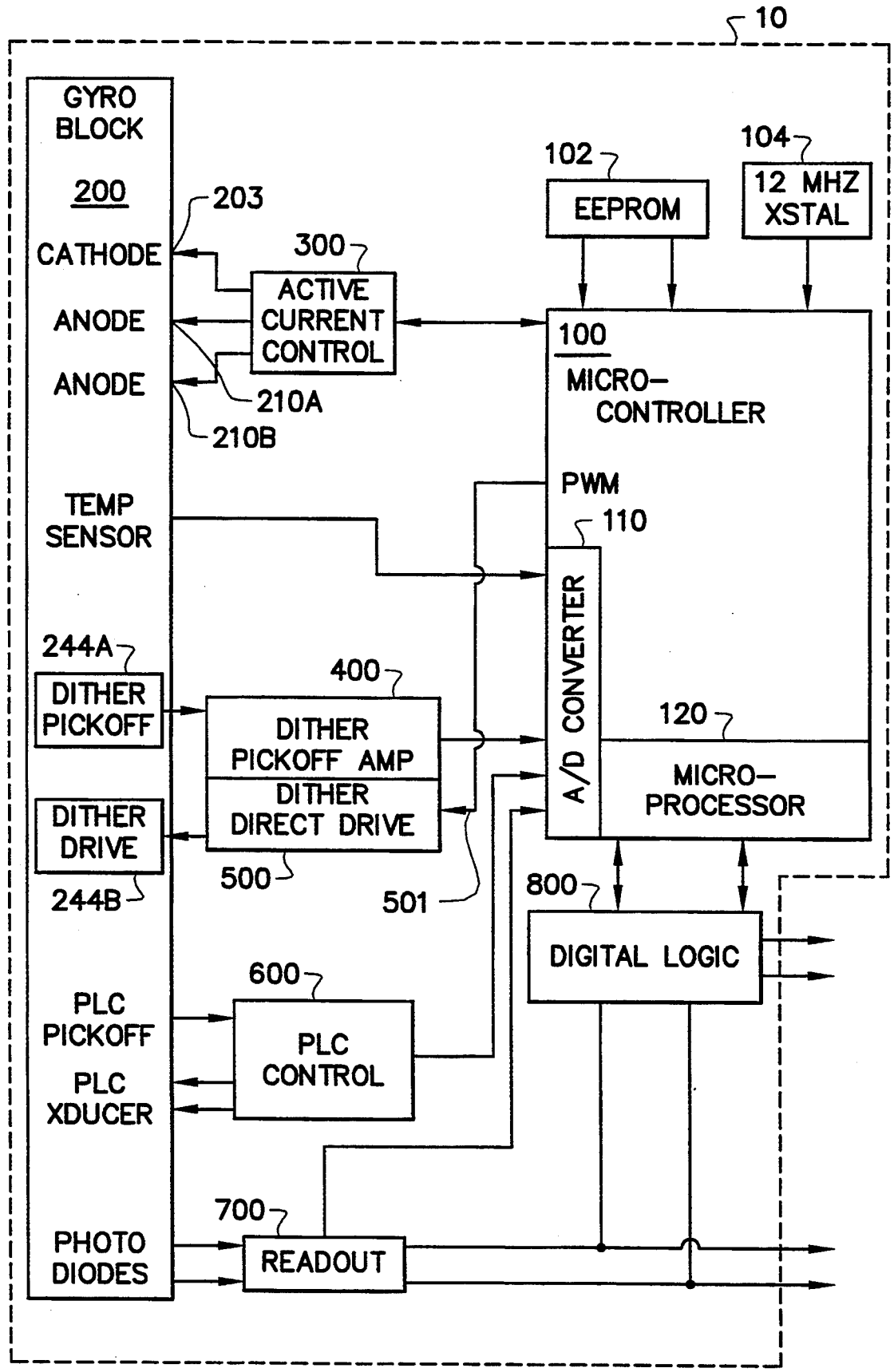
FIG. 1 shows a block diagram of one embodiment of a ring laser gyro employing the novel features of the present invention.

Referring now to FIG. 1, a block diagram of one embodiment of a ring laser gyro employing the novel features of the present invention is shown. The present invention will be explained by way of example embodiments. Those skilled in the art having the benefit of this disclosure will appreciate that the examples herein are by way of illustration of the principals of the invention and not by way of limitation. Ring laser gyro 10 includes a controller 100, a ring laser gyro block 200, an active current control 300, dither pickoff amplifier 400, direct digital dither drive 500, a path length control (PLC) device 600, a readout 700, and digital logic 800. The controller 100, ring laser gyro block 200, active current control 300, path length control (PLC) device 600, readout 700, and digital logic 800 are described in detail in the related applications listed herein which are incorporated by reference.

Figure 2:
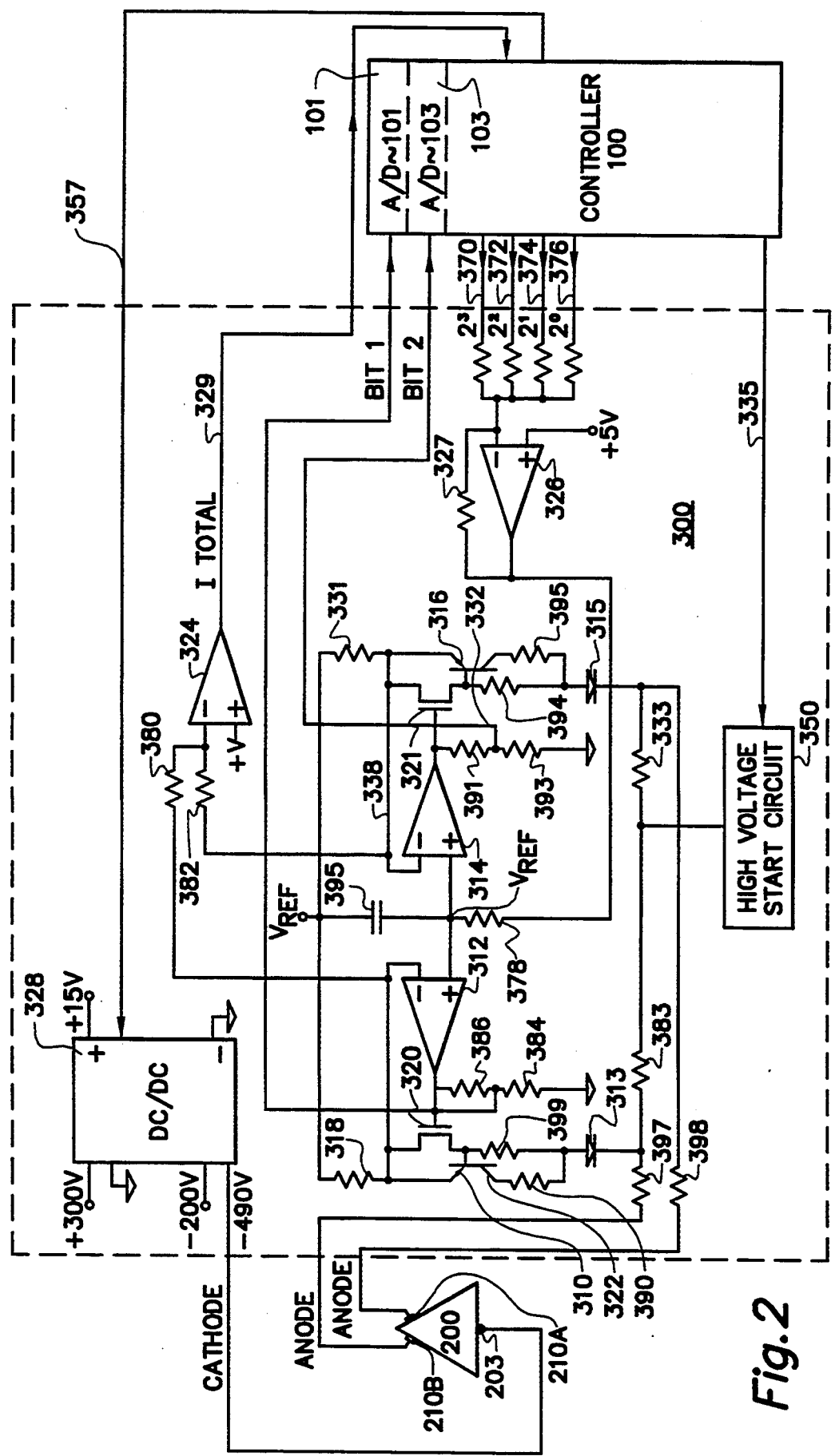
FIG. 2 schematically shows a circuit diagram of one example of an active current control circuit made in accordance with the present invention.

Referring now to FIG. 2, a more detailed circuit diagram of one example of an active current control apparatus as provided by the present invention is shown. Those skilled in the art having the benefit of this disclosure will recognize that the example embodiments described herein are by way of illustration, and not limitation, of the invention. The examples herein are provided in order to aid those skilled in the art in understanding the invention. The gyro block 200 is illustrated as a triangular block having two anodes 201A, 201B and a cathode 203. Those skilled in the art will understand that the ring laser gyro block can comprise other polygonal shapes, such as rectangular. Those skilled in the art will also recognize that various combinations and numbers of electrodes including anodes and cathodes may be used in the ring laser gyro without departing from the scope of this invention.

The active current control apparatus in this example includes first, second, third and fourth amplifying means 312, 314, 324, 326, first and second output transistor means 310, 316, first and second field effect transistor (FET) means 320, 321, DC/DC conversion means 328 and high voltage start circuit means 350. The active current control apparatus 300 is coupled to controller 100 and the ring laser gyro block 200.

The fourth amplifying means 326 is coupled to a gain resistor 327 at its inverting input. Also coupled to the inverting input are four input resistors 370, 372, 374 and 376. The controller 100 operates as a means which generates a digital control signal onto the four input resistors. The fourth amplifying means 326 substantially functions as a digital-to-analog converter wherein the four input resistors correspond to a four bit input in which the first input resistor 370 is the most significant bit and the fourth input resistor 376 is the least significant bit. The fourth amplifying means translates the digital control input from the controller 100 into a proportionate analog signal which is applied through resistor 378 to node $V_{control}$. Thus the active current control 300 can be controlled to within 4 bit accuracy at node $V_{control}$ which correspond to a 10 to 5 volt swing at $V_{control}$.

$V_{control}$ is further coupled to the non-inverting inputs of the first and second amplifying means 312, 314. Each of the first and second amplifying means 312 and 314 drives a field effect transistor 320, 321 which, in turn, control transistors 310, 316 through which current flows to one of the anodes 201A and 201B on gyro block 200. Each of the first and second amplifying means and their associated components may be considered as one "leg" of the active current control. The output of the first amplifier 312, for example, is connected to the gate of a field effect transistor (FET) 320. FET 320 may advantageously be a DMODE FET having a threshold of from about −2 to −4 volts or an equivalent device. FET 320 may advantageously be, for example, an N channel FET such as a JFET or MOSFET with sufficiently low gate impedance to allow substantially all of the current in precision resistors 318,331 to flow to anodes 210A and 210B. FET 320 controls the base drive to high frequency transistor 322. Feedback line 339 provides negative feedback to the first current control amplifier 312. The source of FET 320 is connected to feedback line 339. The drain of FET 320 is connected to the base of the first output transistor 310. The emitter of the first output transistor 310 is connected to the feedback line 339 and through resistor 318 to a first terminal of capacitor 396. The second terminal of capacitor 396 is connected to the node $V_{control}$.

In one embodiment of the invention, when fully charged, capacitor 396 maintains a nominal voltage potential of about +10 volts at its first terminal. The first output transistor 310 has its collector 322 connected through a resistor 390 to the anode of diode 313. Diodes 313 and 315 are high voltage diodes rated at, for example, about 5,000 volts, and serve to protect the active current control circuitry during start up of the ring laser gyro. The base of output transistor 310 is connected to the source of FET 320 and a resistor 399 which is also connected to the anode of diode 313. The cathode of diode 313 is connected through resistor 397 to anode 201B. The second amplifying means 314 is similarly arranged with its associated components, namely, FET 321, the second output transistor 316 and resistance components 391, 393, 394, 331, 333 and the second diode 315 which is connected at its cathode to the second anode 201A. The first amplifying means 312 comprises a first leg of the driving circuit and the second amplifying means 314 and its associated components comprises a second leg of the circuit. Both legs operated in a similar manner to supply substantially equal current to the ring laser gyro. The first and second amplifying means 312, 314 may advantageously comprise operational amplifiers such as, for example, model number LM 2902 having less than about a 1 MHz bandwidth. The first and second transistors 310, 316 may advantageously be slightly reversed biased by 10 volts from base to collector in one example embodiment of the invention. This reverse bias reduces the effective capacitance between the base and collector, thereby improving the transistors' high frequency response.

A third amplifier means 324 may advantageously, optionally be included to provide an output signal 329 which is representative of the sum of the current in each leg of the ring laser gyro. The current sum is designated "I Total". An inverting input of the third amplifier means 324 is connected through resistor 380 to feedback line 339 and through resistor 382 to feedback line 338.

In this example, the cathode 203 of the ring laser gyro is kept at a constant voltage of, for example, in the range of about −425 to −460 volts through DC/DC converter means 328. In operation, DC/DC converter means 328 converts an input voltage of about +15 volts from an external power source to, for example, an output voltage of nominally in the range of about −450 to −490 volts.

Also optionally included in this example of a active current control as provided by the invention are built in test lines BIT 1 and BIT 2. BIT 1 and BIT 2 are coupled to first and second analog-to-digital inputs 101, 103 respectively of controller 100. BIT 1 and BIT 2 provide test signals which are employed by controller 100 to determine whether or not the active current control is in the proper operating range and that the operational amplifiers 312, 314 are not locked up at the high or low power supply limits also called positive or negative rails herein.

One example of a built-in-test that may be employed with the present invention is a high limit test coupled with a low limit test. The high limit test uses the controller 100 to supply a digital command signal to the fourth amplifying means 326 corresponding to a predetermined upper limit for total current. The BIT 1 and BIT 2 signals are then read by the controller 100 and compared by well known comparison means to a nominally acceptable maximum value. Similarly, the low limit test may test the active current control apparatus for a nominally acceptable minimum value. In this way the circuit apparatus can be tested to assure that the apparatus and the ring laser gyro are operating within acceptable limits and are not, for example, operating in a range too near the rails. For example, if one of the legs in the ring laser gyro failed to ignite, this would be an indication that one of the operational amplifiers 312, 314 was locked up at the positive rail.

It is important to the operation of each leg of the active current control to carefully select the resistors at the output of the current supply legs. For the first leg resistors 390, 399 and 397 must be selected according to the equations listed hereinbelow. Similarly, care must be taken in selecting resistors 395, 394 and 333 in the second leg of the active current control. In the first leg, for example, resistors 390 and 399 must be selected such that the voltage on collector 322 of transistor 310 remains relatively constant over the operating range of the current in the ring laser gyro. In one example of the invention resistors 390, 399 and 397 and their counter parts 394, 395 and 333 were selected to operate for a worse case BETA of 10 for PNP transistor 310, 316 at low currents and low temperatures of about −55 degrees centigrade. The selection of these resistors minimizes power dissipation in the transistors 310 and 316. In one example, current is supplied in the range of about 0.15 to 1 ma per leg. These limits are established by the impedance characteristics of the gas discharge and the current limits of the power supply.

Figure 5:
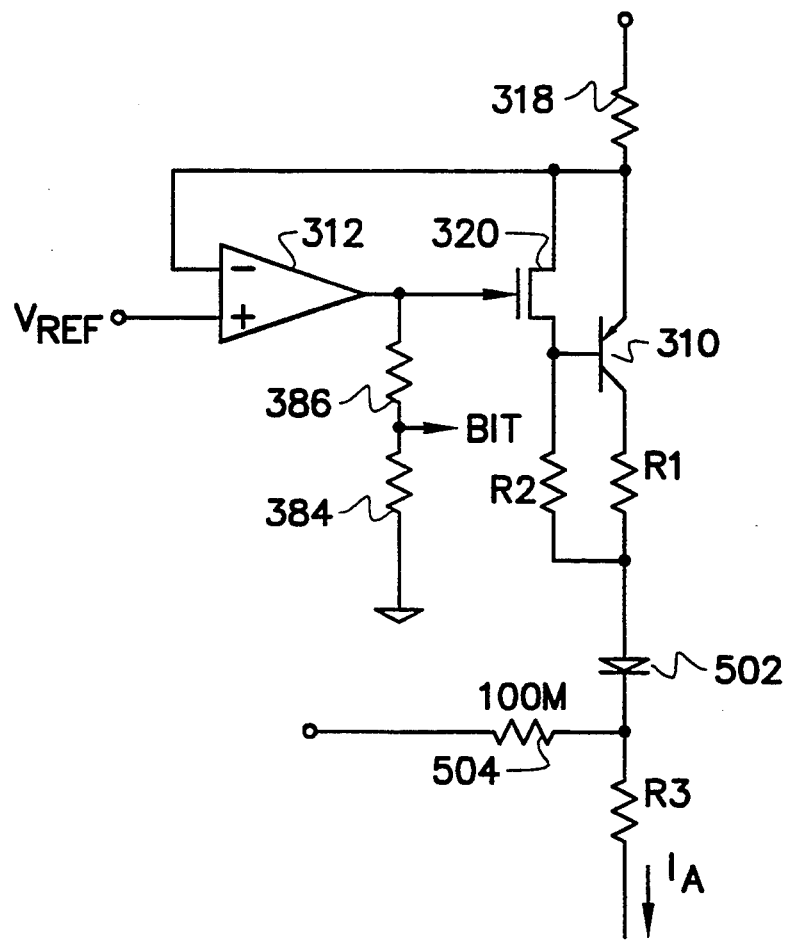
FIG. 5 shows schematically one leg of an active current control apparatus mode in accordance with the present invention.

Referring now to FIG. 5, an example of 1 current source leg of an embodiment of the active current control of the invention is shown for the purposes of illustrating the selection of resistors R1, R2 and R3. It should be noted here that the active current control of the invention takes advantage of the negative resistance inherent in the ring laser gyro tube. That is, as the gyro demands higher current the voltage from the anode to the cathode drops. The invention selects a ratio for R1 and R2 such that the base drive current through R2 increases as current demand for the ring laser gyro tube increases. The resistors R1 and R3 are particularly selected to minimize the power dissipation in transistor 310 at the maximum current. The following equations illustrate a method employed by the current invention to select resistors R1, R2 and R3 in order to operate with a Beta of 10 or less in the PNP transistor 310.

1. A quadratic fit to current-voltage characteristics over the RLG negative resistance region $I_A = 0.15$ to 1 ma is done using the following equation:

$$V_T = K_o + K_1 I_A + K_2 I_A^2 \Delta V_{TEMP} + \Delta V_{PROCESS}$$

where:

$V_T$ = Tube Voltage;
$V_{TL}$ = Tube Voltage at low Temperature;
$V_{TH}$ = Tube Voltage at high Temperature;
$V_C$ = Cathode Voltage;
$I_A$ = Anode Current (one leg);
$V_{CE}$ = the transistor collector-emitter voltage; and
$K_0$, $K_1$ and $K_2$ are constants for the quadratic fit equation which are specific to the I-V characteristics of the laser discharge in the ring laser gyro being modeled by these equations. The conditions for R2 are set as follows:

$$R2 > (V_C - V_{TL})/I_{Amin} \qquad (2)$$

$$R2 > dV_T/dI_A \text{ at lowest current.} \qquad (3)$$

(4)

$$\frac{R2}{R1} < \beta min$$

R1 and R3 must satisfy the following equations:

(5)

$$R1 + R3 = \frac{V_C - V_{TL} - V_{CEmax}}{I_{Amax}}$$

(6)

$$R1 + R3 = \frac{V_C - V_{TH} - V_{CEmin}}{I_{Amin}}$$

7. It is important to note that a PNP transistor has a larger BETA characteristic at −55° C. and lower current when compared to an NPN transistor. Therefore, PNP transistors are preferably used as the current source transistors.

8. In one example an SOT−23 packaged transistor dissipates less than 100 mw at −55° C. for maximum current.

9. In one example an MMBT6520 transistor was employed having the following frequency characteristic:

$$F_T = 40 \text{ MHz}$$

where $$C_{cb} < 6 \text{ pF}$$

10. Collector reverse biased by >10 volts to reduce base-collector capacitance.
11. From operating window data taken at Honeywell Inc. it has been found for certain ring laser gyros that if $R3 > 10$ K for $C_{cb} < 6$ pF, then the operating window is reduced <5%.

All the above conditions are met with:

$R1 = 50$ K, $R2 = 421$ K, and $R3 = 30$ K in one embodiment of the invention.

The Active Current Control apparatus of the invention may be built with $V_C$ Fixed or Variable to reduce power consumption. A fixed $V_C$ approach with proper selection of R1, R2, and R3 allows operation with low Beta. The negative resistance of the IV characteristic is used as an advantage to increase base drive at high currents.

Figure 3:
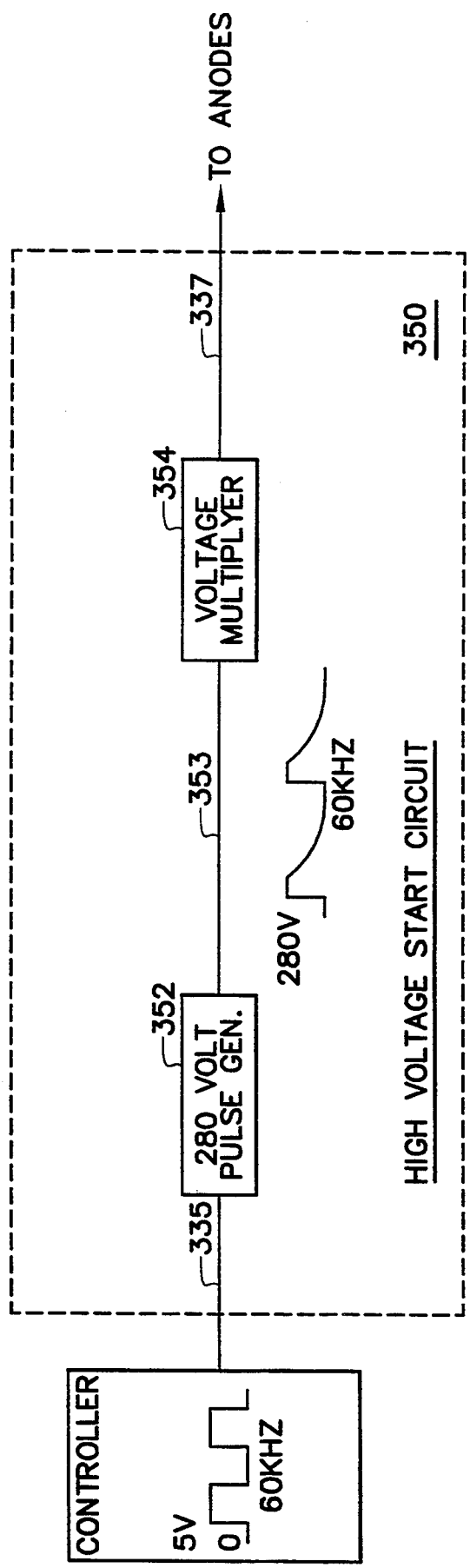
FIG. 3 schematically shows a block diagram of one embodiment of a high voltage start circuit as provided by one aspect of the invention.

Referring now to FIGS. 2 and 3, also included in the active current apparatus provided by the current invention is high voltage start circuit 350 which is coupled through line 337 and resistors 333 and 383 to anode 210A and 210B of ring laser gyro 200. This circuit is employed during the start mode of the ring laser gyro. At line 335, in this example, controller 100 supplies a 0 to 5 volts square wave at a frequency of about 60 KHz with a 10% duty cycle on line 335 which is input to the high voltage start circuit 350. The high voltage starts circuitry 350 comprises a 280 volt pulse generator 352 and a voltage multiplier circuit 354. The pulse generator is used to step up the input voltage square wave on line 335 to a 280 volt signal represented by the waveform shown adjacent line 353. The 280 volt peak-to-peak signal output line 353 is also a 60 KHz signal having a 50% duty cycle which is fed into the voltage multiplier means 354. Voltage multiplier means 354 then outputs a high DC voltage of about 2500 volts. The 280 volt pulse generator and the voltage multiplier component are commercially available. The voltage multiplier component may be purchased from Voltage Multiplier, Inc. of California. The high voltage start circuit is used for starting the ring laser gyro and is turned off when the ring laser gyro is in a running mode.

Figure 4:
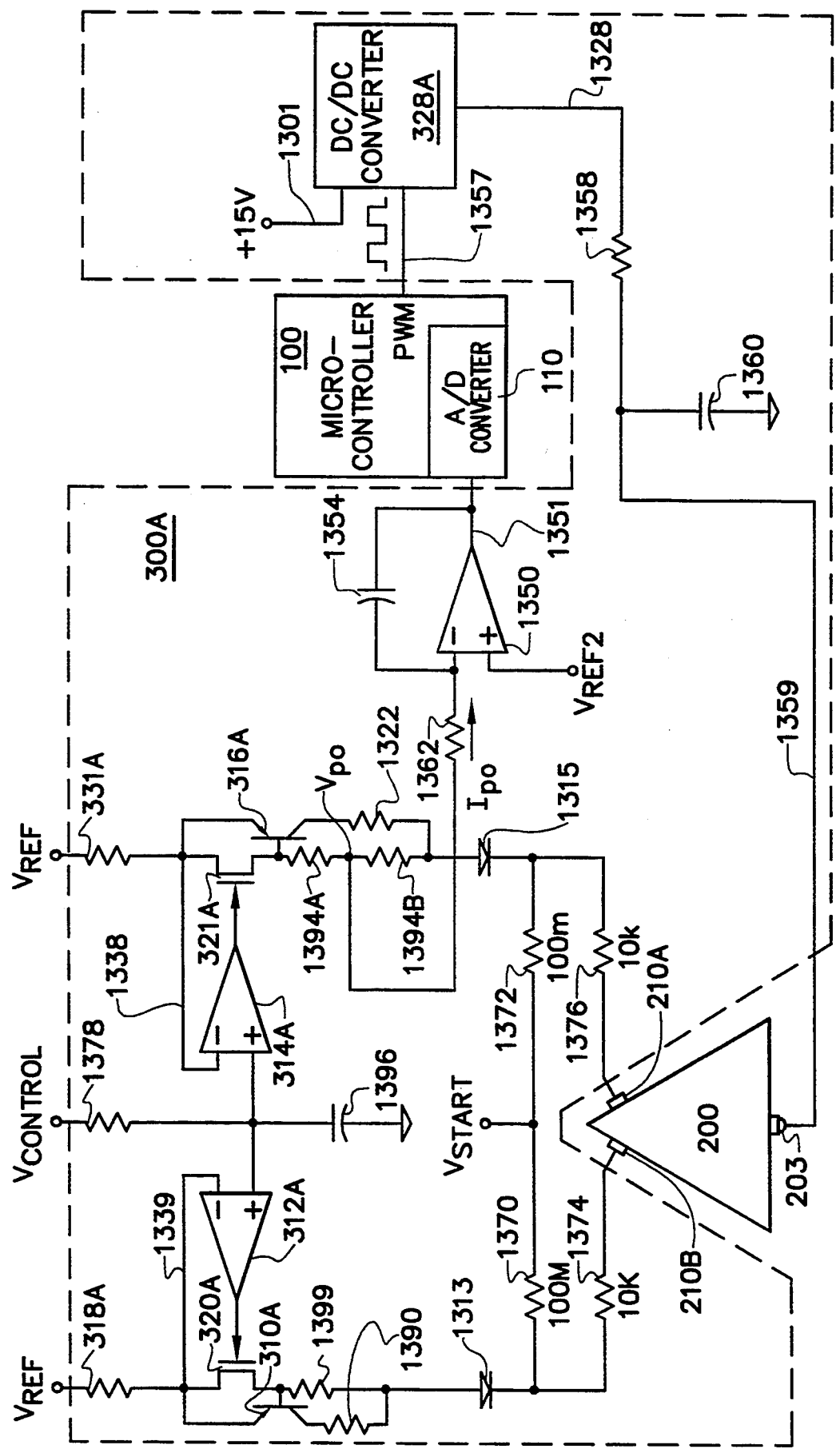
FIG. 4 shows a detailed circuit diagram of an alternate embodiment of an active current control circuit as provided by one aspect of the invention.

Referring now to FIG. 4, an alternate embodiment of an active current control apparatus as provided by the present invention is shown. The active current control apparatus comprises first and second amplifying means 312A, 314A, control JFETs 320A, 321A, first and second output transistors 310A, 316A, integrating amplifier means 1350, micro-controller 100, pulse width modulated DC/DC converter means 328A. The active current control apparatus 300A operates first and second current supply legs including first and second amplifying means 312A, 314A constructed similarly to the two driving legs shown in FIG. 2 comprising first and second driving amplifiers 312, 314. The first and second control JFETs 320A, 321A are advantageously N channel JFETs. A predetermine external voltage $V_{control}$ is applied through resistor 1378 to the non inverting inputs of the first and second drive amplifiers 312A, 314A.

A first terminal of capacitor 1396 is also connected to the non-inverting inputs of the first and second amplifying means for the purposes of filtering the $V_{control}$ voltage. As is the case in the circuit of FIG. 2, feedback lines 1339 and 1338 are connected from the sources of the JFETs 320A, 321A respectively to the inverting inputs of the first and second amplifying means 312A, 314A. Reference voltage $V_{REF}$ is introduce into the feedback lines 1339, 1338 through precision resistors 318A and 331A, respectively. The reference voltage $V_{REF}$ may advantageously be about +10 volts DC. JFETs 320A, 321A and output transistors 310A, 316A operate together with resistors 1390, 1399, 1394A, 1394B, 1322 and diodes 1313, 1315 in a manner similar to their similarly arranged counterparts described with respect to FIG. 2.

Here departing further from the configuration shown in FIG. 2, the base of the second output transistor 316A is connected to resistor 1394A which is in series with resistor 1394B. An integrating amplifying means 1350 having feedback capacitor 1354 includes a reference voltage $V_{REF2}$ which may advantageously be about 2.5 volts in one example embodiment. A sampled signal $V_{po}$ is tapped between resistors 1394A and 1394B. A small current is sent through resistor 1362 when $V_{po}$ has a value which does not equal $V_{REF2}$ to an inverting input of integrating amplifying means 1350. Since $V_{po}$ is servoed to equal $V_{REF2}$ by the DC/DC converter 328A, the current $I_{po}$ is approximately 0. Further, it is important to note that only one leg of the active current source circuit is in the servo loop. This accounts for differences which may exist in the ring laser gyro tube voltages for the two legs. Since the apparatus uses a servo mechanism to adjust only one leg, the currents in both legs are substantially unaltered. The apparatus further takes the ring laser gyro tube voltages into account by reverse biasing the collectors of transistors 310A and 316A by at least 10 volts. Even with this added biasing the apparatus allows the ring laser gyro to operate with voltages having much lower absolute values of voltage than those found in the prior art.

Integrating amplifying means 1350 provides a signal 1351 to an analog-to-digital input of analog-to-digital converter 110, which is part of micro-controller 100. Micro-controller 100 processes signal 1351 in a well known manner and outputs a pulse width modulated signal (PWM) which is responsive to the signal 1351 to an input of proportional DC/DC converter 328A. DC/DC converter 328A in turn provides an output 1328 which is proportional to the PWM signal through an RC filter comprising a resistor 1358 and a capacitor 1360 to the cathode 203 of the ring laser gyro 200. In the example embodiment shown, a positive 15 volts is supplied to a positive input 1301 of the DC/DC converter 328A. Those skilled in the art will appreciate that other equivalent devices may be substituted in the circuit discussed with reference to FIG. 4. For example a transistor coupled to a proportional DC/DC converter may be substituted for the pulse width modulation apparatus discussed above.

In operation, voltage signal $V_{po}$ provides an input to the integrator comprising the integrating amplifying means 1350, capacitor 1354. The sample voltage is inverted through the integrator which may preferable have a 20 second time constant. The output of the integrating amplifier 1350 is sampled by the micro-controller A/D converter 110. The micro-controller then provides a pulse width modulated signal input to the DC/DC converter 328A. The DC/DC converter operates to bring the sampled point down to the reference voltage $V_{REF2}$ in this example. This configuration has the advantage that all of the power in the circuit is dissipated at the plasma in the ring laser gyro and there is no need for even small ballast resistors. Some nominal values of resistance are shown in order to provide a better understanding of this example of embodiment of the invention.

Still referring to FIG. 4, in one prototype example embodiment of the invention constructed by Honeywell Inc., an active current control circuit apparatus was built using 2N3743 PNP transistor dies in hybrid packages for the output transistors. It was later found that a significant cost reduction could be achieved by substituting an MMBT6520 PNP transistor in a surface mounted SOT-23 package. The only high frequency component required in the circuitry is the 2N3743 transistor that has a $F_T$ of greater then 30 MHz and a collector-base capacitance of less than 15 pF. The cathode voltage servoes to minimize the power dissipation in the electronics which is important to a modular electronics design since all the electronics are located in the gyro housing. One of the 2N3743 collector voltages, namely $V_{po}$, is monitored using a 22 M ohm resistor, which in turn supplies a small current to an integrator. The output of the integrator then controls the input to the DC/DC converter. The closed loop time constant is approximately 0.5 seconds. In one example, as the input to the A/D converter varies from about 0 to 5 volts, the corresponding pulse width modulated signal has a duty cycle ranging from about 45% to about 30%.

Ring laser gyros exhibit a negative resistance when operating. The negative resistance of the ring laser gyro results in approximately constant power dissipation. The cathode voltage automatically servos to a lower voltage as the current increases, thereby conserving power. The design delivers about 200–400 milliwatts of power to the gyro while dissipating a maximum of about 50 milliwatts.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

For example, a dual ring laser gyro system can be constructed using the present invention wherein the active current is supplied to cathodes instead of anodes of a ring laser gyro. In such a case the PNP transistors employed in the examples herein are replaced with NPN transistors, N-channel FETs are replaced by P-channel FETs and the polarities of the power supplies are reversed.

What is claimed is:

1. A current control apparatus for a ring laser gyro including a beam path, a first electrode having a first polarity, and a second electrode having the same polarity as the first electrode, wherein the current control apparatus comprises:
   a. total current control means for generating a control signal representative of a current value;
   b. first means coupled to the control signal for supplying actively controlled current to the first electrode of the ring laser gyro in response to the control signal wherein the actively controlled current supply means comprises active impedances including a first amplifying means and a first field effect transistor for stabilization and control; and
   c. second means coupled to the control signal for supplying actively controlled current to the second electrode of the ring laser gyro in response to the control signal wherein the actively controlled current supply means comprises active impedances including a second amplifying means and a second field effect transistor for stabilization and control so as to maintain a constant current in the ring laser gyro beam path.

2. The current control apparatus of claim 1 wherein the means for generating a control signal representative of a current value comprises a digital controller.

3. The current control apparatus of claim 2 wherein the means for generating a control signal comprises a microprocessor.

4. The current control apparatus of claim 3 wherein the microprocessor further includes a means for running a built-in-test of the current control apparatus.

5. A current control apparatus for a ring laser gyro including a beam path, a first electrode having a first polarity and a second electrode having the same polarity as the first electrode, wherein the current control apparatus comprises:
   a. means for generating a control signal representative of a current value;
   b. a first current source leg coupled to the first electrode;
   c. a second current source leg coupled to the second electrode;
   d. a first current control means in said first current source leg coupled to the control signal for supplying actively controlled current to the first electrode of the ring laser gyro in response to the control signal;
   e. a second current control means in said second current source leg coupled to the control signal for supplying actively controlled current to the second electrode of the ring laser gyro in response to the control signal; and
   f. each of the first and second current control legs further comprising:
      1. an amplifying means coupled to the control signal, wherein the amplifying means includes an output and a second feedback means;
      2. a field effect transistor means including a gate, drain and source wherein the gate is coupled to the output of the amplifying means;
      3. a transistor means having an emitter, base and collector wherein the base is connected to the drain of the field effect transistor means, and the emitter is connected to the feedback means;
      4. a first resistance means connected at a first terminal to the collector;
      5. a second resistance means connected at a first terminal to the base;
      6. a diode means having an anode and a cathode and connected at its anode to a second terminal of each of the first and second resistance means; and
      7. a third resistance means connected between the cathode of the diode means and one of the first and second electrode of the ring laser gyro, wherein the transistor means has a worst case Beta operating parameter and the first, second and third resistance means are selected to insure operation of the transistor in a desired current range for the worst case Beta.

6. The current control apparatus of claim 1 further comprising a means for summing the total current supplied by the first means for supplying actively controlled current and the second means for supplying active controlled current.

7. A current control apparatus for a ring laser gyro including a beam path and a first electrode having a first polarity, wherein the current control apparatus comprises:
 a. means for generating a digital control signal representative of a current value;
 b. means coupled to the digital control signal for translating the digital control signal into an analog signal in proportion to the digital control signal; and
 c. means coupled to the analog signal for supplying actively controlled current in response to the analog signal wherein the actively controlled current supply means comprises substantially active impedances for stabilization and control so as to maintain a constant current in the ring laser gyro beam path and so as to operate over a wide control range with substantial power efficiency.

8. The current control apparatus of claim 7 wherein the means for generating a digital control signal representative of a current value comprises a digital controller.

9. The current control apparatus of claim 8 wherein the digital controller comprises a microprocessor.

10. The current control apparatus of claim 9 wherein the microprocessor further includes a means for running a built-in-test of the current control apparatus.

11. The current control apparatus of claim 7 wherein the ring laser gyro includes a second electrode having the same polarity as the first electrode, wherein the means for supplying actively controlled current comprises a first current source leg and a second current source leg, and wherein the first current source leg is coupled to the first electrode and the second current source leg is coupled to the second electrode.

12. The current control apparatus of claim 11 wherein each of the first and second current control legs comprise:
 a. an amplifying means coupled to the analog signal from the translating means, wherein the amplifying means includes an output and a feedback means;
 b. a field effect transistor means including a gate, drain and source wherein the gate is coupled to the output of the amplifying means;
 c. a transistor means having an emitter, base and collector wherein the base is connected to the drain of the field effect transistor means, and the emitter is connected to the feedback means;
 d. a first resistance means connected at a first terminal to the collector;
 e. a second resistance means connected at a first terminal to the base;
 f. a diode means having an anode and a cathode and connected at its anode to a second terminal of each of the first and second resistance means; and
 g. a third resistance means connected to the cathode of the diode means, wherein the transistor means has a worst case Beta operating parameter and the first, second and third resistance means are selected to insure operation of the transistor in a desired current range for the worst case Beta.

13. The current control apparatus of claim 7 further comprising a means for summing the total current supplied by the means for supplying the actively controlled current.

14. The current control apparatus of claim 7 wherein the ring laser gyro includes a second electrode having the same polarity as the first electrode, wherein the means for generating a digital control signal further includes a means for generating a start circuit control signal and the current control apparatus further comprises a means for providing a high voltage starting signal, including a control input and an output, coupled to the start circuit control signal at the control input and coupled at its output to one of the first and second electrodes of the ring laser gyro.

15. The current control apparatus of claim 1 wherein the ring laser gyro also includes a cathode and the current control apparatus further comprises a proportional DC/DC voltage converter means having an input and an output wherein the input is coupled to the actively controlled current supply means at a sampled point where a sampled signal is present and the output is coupled to the cathode of the ring laser gyro so as to control the voltage level at the cathode of the ring laser gyro in response to the sampled signal.

16. The current control apparatus of claim 15 wherein the proportional DC/DC voltage converter means further comprises:
 a. an integrator means coupled at an input to the sampled point;
 b. a controller means having an analog-to-digital input and a pulse width modulated output wherein the analog-to-digital input is coupled to an output of the integrator means and the pulse width modulated output generates a pulse width modulated signal in response to the output of the integrator means;
 c. an integrated circuit means for converting DC voltage in proportion to an input signal wherein the integrated circuit means includes an input connected to the pulse width modulated signal and an output for supplying a converted voltage which is proportional to the pulse width modulated signal; and
 d. a filtering circuit means connected between the converted voltage and the cathode of the ring laser gyro.

17. The apparatus of claim 16 wherein the controller means comprises a digital micro-controller.

18. The apparatus of claim 16 wherein the integrated circuit means provides a converted output voltage in the range of about 0 to about 550 volts DC.

19. The current control apparatus of claim 7 wherein the ring laser gyro also includes a cathode and the current control apparatus further comprises a proportional DC/DC voltage converter means having an input and an output wherein the input is coupled to the actively controlled current supply means at a sampled point where a sampled signal is present and the output is coupled to the cathode of the ring laser gyro so as to control the voltage level at the cathode of the ring laser gyro in response to the sampled signal.

20. A current control apparatus as recited in claim 1 wherein said first field effect transistor and said second field effect transistor have interval capacitances less than 10 pica-farads.

21. A current control apparatus as recited in claim 1 wherein said first field effect transistor fields current to said first electrode through a first ballast resistor and said second field effect transistor fields current to said second electrode through a second ballast resistor, said first ballast resistor and said second ballast resistor each having a value less than 20 K Ohms.

22. A current control apparatus for a ring laser gyro, said ring laser gyro having a cathode, a first anode and a second anode, wherein the control apparatus comprises:

a. a controllable power supply connected to said cathode to supply a negative direct current voltage of between −450 volts DC and −490 volts DC to said cathode;

b. a total current control means for generating a control signal representative of a current value;

c. a first means coupled to the control signal for supplying actively controlled current to the first anode through a first ballast resistor of less than 20 K Ohms, wherein said first means including active impedance devices including a first amplifying means and a first field effect transistor having an interval capacitance of less than 10 pica farads; and d. a second means coupled to the control signal for supplying actively controlled current to the second anode through a second ballast resistor of less than 20 K Ohms wherein said second means includes active impedance device including a second amplifying means and a second field effect transistor having an interval capacitance of less than 10 pica farads.

* * * * *